(12) United States Patent
Morris et al.

(10) Patent No.: US 8,359,144 B2
(45) Date of Patent: Jan. 22, 2013

(54) DRIVELINE LASH MANAGEMENT IN POWERTRAIN SYSTEMS

(75) Inventors: Robert L. Morris, Milford, MI (US); Gil J. Mendoza, Novi, MI (US); R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 12/916,729

(22) Filed: Nov. 1, 2010

(65) Prior Publication Data

US 2012/0109474 A1 May 3, 2012

(51) Int. Cl.
*G06F 7/00* (2006.01)
*G06F 19/00* (2006.01)

(52) U.S. Cl. ............. 701/51; 701/29.1; 701/36; 701/54; 701/55; 180/400; 475/331; 475/346; 74/640

(58) Field of Classification Search ............... 701/29.1, 701/36, 51, 54–55; 475/346–347, 331; 180/400; 74/640
See application file for complete search history.

(56) References Cited

U.S. PATENT DOCUMENTS

| | | | | |
|---|---|---|---|---|
| 3,885,446 | A * | 5/1975 | Pengilly | 74/331 |
| 5,222,579 | A * | 6/1993 | Frania | 188/79.55 |
| 5,802,921 | A * | 9/1998 | Rouverol | 74/458 |
| 7,261,667 | B2 * | 8/2007 | Berger | 475/347 |
| 7,577,507 | B2 * | 8/2009 | Morris | 701/51 |
| 7,810,409 | B2 * | 10/2010 | Okada et al. | 74/493 |
| 8,046,142 | B2 * | 10/2011 | Morris et al. | 701/51 |
| 2007/0093354 | A1 * | 4/2007 | Berger | 475/346 |
| 2010/0114424 | A1 * | 5/2010 | Morris et al. | 701/31 |

(Continued)

FOREIGN PATENT DOCUMENTS

CN 101169162 A * 4/2008
(Continued)

OTHER PUBLICATIONS

The principle of the potentiometer and its applications in the vehicle steering; Xiao Dong Zhang; Long Yun Kang; Wei Feng Diao Vehicular Electronics and Safety, 2005. IEEE International Conference on; Digital Object Identifier: 10.1109/ICVES.2005.1563607 Publication Year: 2005 , pp. 20-24.*

(Continued)

*Primary Examiner* — Cuong H Nguyen

(57) ABSTRACT

A powertrain system includes a torque machine mechanically rotatably coupled via a transfer gear set to a drive wheel. The transfer gear set includes a first gear meshingly engaged to a second gear with lash angle between the first and second gears. A method for operating the powertrain system includes monitoring an output speed associated with the torque machine and a wheel speed associated with the drive wheel. A transition between a first torque transfer state and a second torque transfer state is detected, the transition including a gear lash event across the transfer gear set. An elapsed time period for completing the gear lash event across the transfer gear set during the transition between the first torque transfer state and the second torque transfer state is set, and a target output speed derived from the wheel speed during and at the end of the elapsed time period is determined. A preferred output speed profile during the gear lash event is also determined, and includes prescribed changes in the output speed associated with phase-shifting the lash angle from a minimum lash angle to a maximum lash angle. The output speed is adjusted to be substantially equal to the target output speed at the end of the elapsed time period. The torque machine is controlled to achieve the preferred output speed profile.

17 Claims, 2 Drawing Sheets

U.S. PATENT DOCUMENTS

| | | | |
|---|---|---|---|
| 2011/0007992 A1* | 1/2011 | Wolf | 384/494 |
| 2012/0080256 A1* | 4/2012 | Janz et al. | 180/429 |
| 2012/0109474 A1* | 5/2012 | Morris et al. | 701/54 |

FOREIGN PATENT DOCUMENTS

| | | | |
|---|---|---|---|
| CN | 201382100 Y | * | 1/2010 |
| EP | 2102517 A2 | * | 9/2009 |
| JP | 07291046 A | * | 11/1995 |
| JP | 11005544 A | * | 1/1999 |
| JP | 2000170902 A | * | 6/2000 |
| JP | 2007002885 A | * | 1/2007 |
| KR | 696255 B1 | * | 3/2007 |
| WO | WO 2006120968 A1 | * | 11/2006 |
| WO | WO 2008055055 A2 | * | 5/2008 |

OTHER PUBLICATIONS

A novel asymmetrical pitch system for a rotor micro air vehicle; Shaorong Xie; Jun Luo; Zhenbang Gong; Shanbo Hao Robotics and Biomimetics, 2007. ROBIO 2007. IEEE International Conference on; Digital Object Identifier: 10.1109/ROBIO.2007.4522441; Publication Year: 2007 , pp. 1810-1814.*

Study on the variables in designing the internal parallel move gears transmission; Tian, Xiaoming; Han, Gang; Zhang, ChunLin; Wang, SongLei; Technology and Innovation Conference 2009 (ITIC 2009), International; Digital Object Identifier: 10.1049/cp.2009.1489; Publication Year: 2009 , pp. 1-3.*

Slip control for a lock-up clutch with a robust control method; Adachi, K.; Ochi, Y.; Segawa, S.; Higashimata, A. SICE 2004 Annual Conference; vol. 1; Publication Year: 2004 , pp. 744-749 vol. 1.*

Improvement of steering feel of Electric Power Steering system with Variable Gear Transmission System using decoupling control Morita, Y. et al..; Advanced Motion Control, 2008. AMC '08. 10th IEEE International Workshop on;Dig. Obj. Id.: 10.1109/AMC.2008.4516103; Publication Year: 2008 , pp. 417-422.*

Dynamic Characteristics on the Dual-Power State of Flow in Hydro-Mechanical Transmission; Jibin Hu; Shihua Yuan; Xiaolin Guo Mechatronics and Automation, 2007. ICMA 2007. International Conference on; Digital Object Identifier: 10.1109/ICMA.2007.4303663; Publication Year: 2007 , pp. 890-894.*

Yaw rate control of electric vehicle using steer-by-wire system; Hosaka, M.; Murakami, T.; Advanced Motion Control, 2004. AMC '04. The 8th IEEE International Workshop on; Digital Object Identifier: 10.1109/AMC.2004.1297636; Publication Year: 2004 , pp. 31-34.*

\* cited by examiner

DRIVELINE LASH MANAGEMENT IN POWERTRAIN SYSTEMS

TECHNICAL FIELD

This disclosure is related to driveline lash management in an electrically-driven powertrain system.

BACKGROUND

The statements in this section merely provide background information related to the present disclosure and may not constitute prior art.

Powertrain systems include torque generator(s), e.g., an internal combustion engine and/or torque machine(s) powered by non-fossil fuel. The torque machine(s) powered by non-fossil fuel include e.g., stored electric energy, stored hydraulic energy, and stored pneumatic energy. The torque generator(s) transfer torque via a transmission device to a driveline for traction to propel a vehicle.

Meshed driveline components, e.g., transmission splines and interleafed gearing teeth on planetary gear sets, have clearances that are a result of manufacturing tolerances and component design specifications. Such clearances facilitate assembly, accommodate build variation and thermal expansion of the components, allow for lubrication, and permit deflection of teeth under load conditions. Gear lash, i.e., play or slack in relative rotational positions of the meshed driveline components, results from the clearances between the meshed components.

A torque reversal is a torque transition event wherein torque transfer across meshed driveline components transitions from transferring torque in a first rotational direction to transferring torque in a second, opposite rotational direction. During a torque reversal, existing gear lash causes a period during the transition wherein zero torque is transferred between the meshed driveline components in either rotational direction. When gear lash is subsequently closed, impacts between the meshed driveline components produce clunks (i.e., audible noises) and jerks (e.g., physical lurches), either of which may be objectionable to a vehicle operator and may cause undue stress on the meshed driveline components.

Torque reversals may be the result of an operator shifting a transmission from a Park position to either a Drive position or a Reverse position, or shifting between the Drive and Reverse positions. Torque reversals may occur during ongoing operation due to a throttle tip-in when an operator commands a vehicle to accelerate while the vehicle is coasting, or a throttle tip-out. In a throttle tip-in, the driveline is initially exerting torque on the powertrain system by way of engine braking or regenerative braking, and the command to accelerate results in a torque reversal when the engine or motor/generator begins exerting torque on the driveline. In a throttle tip-out, there is an opposite torque reversal.

SUMMARY

A powertrain system includes a torque machine mechanically rotatably coupled via a transfer gear set to a drive wheel. The transfer gear set includes a first gear meshingly engaged to a second gear with lash angle between the first and second gears. A method for operating the powertrain system includes monitoring an output speed associated with the torque machine and a wheel speed associated with the drive wheel. A transition between a first torque transfer state and a second torque transfer state is detected, the transition including a gear lash event across the transfer gear set. An elapsed time period for completing the gear lash event across the transfer gear set during the transition between the first torque transfer state and the second torque transfer state is set, and a target output speed derived from the wheel speed during and at the end of the elapsed time period is determined A preferred output speed profile during the gear lash event is also determined, and includes prescribed changes in the output speed associated with phase-shifting the lash angle from a minimum lash angle to a maximum lash angle. The output speed is adjusted to be substantially equal to the target output speed at the end of the elapsed time period. The torque machine is controlled to achieve the preferred output speed profile.

BRIEF DESCRIPTION OF THE DRAWINGS

One or more embodiments will now be described, by way of example, with reference to the accompanying drawings, in which.

DETAILED DESCRIPTION

Figure 1:
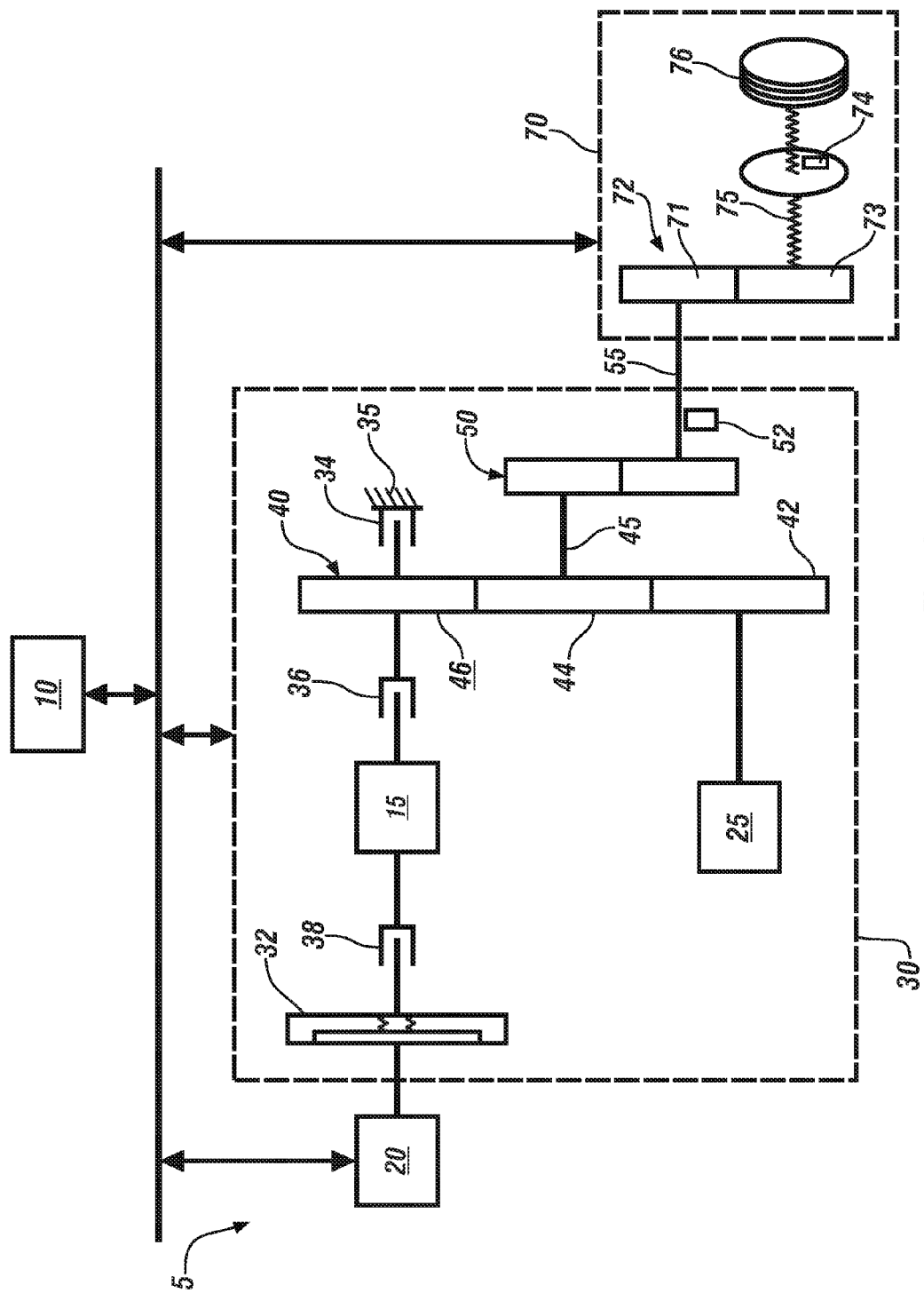
FIG. 1 is a schematic drawing of an exemplary hybrid powertrain system and driveline, in accordance with the disclosure.

Referring now to the drawings, wherein the showings are for the purpose of illustrating certain exemplary embodiments only and not for the purpose of limiting the same, FIG. 1 schematically illustrates an exemplary powertrain system 5 and driveline 70 that may be implemented to propel a vehicle.

The powertrain system 5 includes an internal combustion engine 20, torque machines including first and second motor/generators 15 and 25 (MB), respectively, and transmission 30 that are mechanically coupled via shaft elements to the driveline 70 to effect torque transfer therebetween. A control module 10 is configured to monitor operator inputs and various sensing devices and command operation of various actuators to control operation of the powertrain system 5 and the driveline 70.

The transmission 30 includes a differential gear set 40, which is a simple planetary gear set in one embodiment including a sun gear 42, carrier gear set 44, and a ring gear 46. The differential gear set 40 is configured to transfer torque between the internal combustion engine 20, the first and second motor/generators 15 and 25, and driveline 70 via a transfer gear 50 and an output member 55. In one embodiment, the internal combustion engine 20 couples via a damper clutch 32 and controllable clutch element C3 38 to the first motor/generator 15 to transfer torque thereto. The first motor/generator 15 couples via controllable clutch element C2 36 to the ring gear 46, which selectively couples to a transmission case ground element 35 via controllable clutch element C1 34. The carrier gear set 44 transfers torque via a rotatable member 45 to the transfer gear 50, which couples to the output member 55 that is coupled to the driveline 70. Such an arrangement permits torque transfer between the engine 20 and the first motor/generator 15, between the first motor/generator 15 and the differential gear set 40, between the second motor/generator 25 and the differential gear set 40, and between the first and second motor/generators 15 and 25 and the driveline 70 via the output member 55. A sensor 52 is configured to monitor rotational speed and position of the output member 55 of the transmission 30, i.e., output speed. The sensor 52 provides the output speed to the control module 10. The driveline 70 includes one or a plurality of transfer gear set(s) 72 that rotatably couple to axles, half-shafts or other suitable torque transfer components that are coupled to vehicle wheels 76. As depicted, the transfer gear set(s) 72 includes first and second meshingly engaged gears 71 and 73, respectively, with the first gear 71 mechanically coupled to output shaft 55 and the second gear 73 mechanically coupled to a rotatable member 75 that may include an axle, half-shaft or other suitable torque transfer component that couples to one of the vehicle wheels 76. A single one or a plurality of sensors 74 is configured to monitor rotational speed and position of the wheels 76, i.e., wheel speed. The sensor(s) 74 provides the wheel speed to the control module 10.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module 10 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
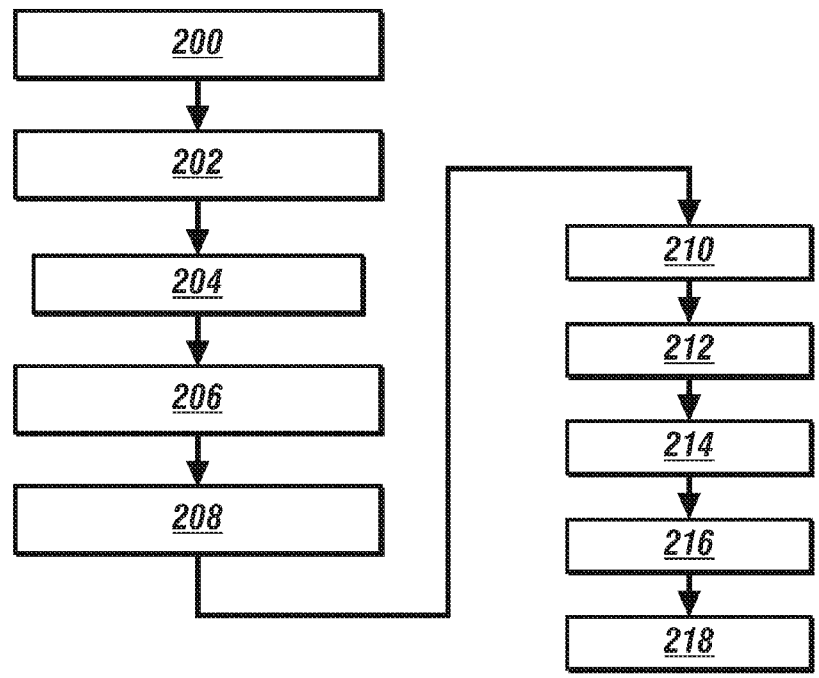
FIG. 2 is a schematic drawing of a control scheme in flowchart form for operating a powertrain system during a transition between a first torque transfer state and a second torque transfer state, in accordance with the disclosure.

FIG. 2 depicts a control scheme 200 in flowchart form for operating a powertrain system including a torque machine that mechanically rotatably couples to a driveline include a drive wheel during a transition between a first torque transfer state and a second torque transfer state. The control scheme 200 of FIG. 2 is executable in the powertrain system 5 and driveline 70 depicted in FIG. 1, and described with reference thereto. The driveline 70 depicted in FIG. 1 includes the transfer gear set(s) 72 including meshingly engaged first and second gears 71 and 73 having a known magnitude of gear lash therebetween. Sensor 52 is configured to monitor rotational speed and position of the output member 55, i.e., the output speed, and the sensor(s) 74 is configured to monitor rotational speed and position of the wheel(s) 76, i.e., the wheel speed.

Table 1 is provided as a key to the flowchart of FIG. 2 wherein the numerically labeled blocks and the corresponding functions are set forth as follows.

TABLE 1

FIG. 2

| BLOCK | BLOCK CONTENTS |
|---|---|
| 200 | Control Scheme |
| 202 | Determine transfer gear set characteristics |
| 204 | Monitor Na, Nb, No, Nwhl, Treq |
| 206 | Detect occurrence of torque transition that includes a gear lash event |
| 208 | Set elapsed time period for gear lash event |
| 210 | Estimate Nwhl-target during gear lash event |
| 212 | Determine No-target during gear lash event |
| 214 | Determine output speed profile |
| 216 | Determine preferred output speed profile (prescribed changes to No) corresponding to output speed profile and No_target |
| 218 | Control MB to achieve preferred output speed profile |

The control scheme includes initially determining and quantifying characteristics associated with the transfer gear set of interest (202). One characteristic of interest is the gear lash of the meshed driveline components, which may be described in terms of degrees of angle of rotation, or a rotational distance of gear play, or another suitable measurement. It is appreciated that the gear lash may be a single value that represents gear lash across a single meshed gear set. Alternatively, the gear lash may represent gear lash across a plurality of serially-arranged or parallel-arranged meshed gear sets. Preferably, the gear lash is predetermined, but may also be determined during ongoing operation when measurement techniques and devices are readily available.

Rotational speeds across the transfer gear set of interest and other rotational speeds and inputs are periodically and ongoingly monitored or otherwise determined (204). In one embodiment, measurable rotational speeds of interest include a rotational speed of the output member 55, i.e., output speed (No), and a wheel speed of one or a plurality of the drive wheels 76, i.e., wheel speed (Nwhl). In the embodiment shown with reference to FIG. 1, the rotational speed of the output member 55 (No) may be directly correlated to the rotational speed of the second motor/generator 25 (Nb), and may also be directly correlated to the rotational speed of the first motor/generator 15 (Na) when controllable clutch element C2 36 is activated. Preferably, an operator torque request (Treq) is also monitored, which includes monitoring operator input(s) to an accelerator pedal and a brake pedal, and other suitable means. Other monitored conditions may include operation of a regenerative braking system, states of charge of battery devices configured to provide electric power to the first and second motor/generators 15 and 25, and other operating systems that affect mechanical and electrical power demands in the powertrain system and thus affect torque generation through the powertrain system and the driveline.

A torque transition event includes a transition between a first torque transfer state and a second torque transfer state during which a gear lash event occurs across the transfer gear set, and includes driveline torque reversals in various forms. The torque transfer states include positive and negative torque transfer states. The first torque transfer state may include a positive torque transfer, wherein the powertrain system transfers torque to the driveline to effect vehicle propulsion in a forward direction. The second torque transfer state may include a negative torque transfer, wherein the driveline transfers torque to the powertrain system during vehicle coast as an element of a powertrain system braking event and/or as an element of regenerative braking operation. The second torque transfer state may include negative torque transfer to effect vehicle propulsion in a reverse direction. When a torque transition event occurs between the first torque transfer state and the second torque transfer state, there is a gear lash event across the transfer gear set during which there is zero torque transfer across the transfer gear set.

In operation, occurrence of a torque transition event that includes a gear lash event is detected (206). A torque transition event may be detected by monitoring operator inputs, including, e.g., an operator shifting a transmission from a Park position to either a Drive position or a Reverse position, or shifting between the Drive and Reverse positions. A torque transition event may occur during ongoing operation due to a throttle tip-in when an operator commands a vehicle to accelerate while the vehicle is coasting, or a throttle tip-out.

When a torque transition event is detected, an elapsed time period is set for completing the gear lash event across the transfer gear set (208). The elapsed time period is affirmatively set by the control module, and is associated with operator-acceptable perceptions of hesitation or delay between an operator torque request, e.g., an accelerator pedal tip-in event or a transmission gear indicator change event (e.g., Park-to-Drive), and a vehicle torque response. In one embodiment, the elapsed time period for the torque transition event is affirmatively set at 200 ms. Alternative elapsed time periods for the torque transition event may be suitable for the operating system, powertrain system application and present operating conditions including the operator torque request (Treq).

Projected or target values for the wheel speed of the drive wheel 76 (Nwhl_target) during and at the end of the elapsed time period are estimated or otherwise determined (210).

Corresponding target values for the output speed (No_target) are determined, and are substantially equal to the target values for the wheel speed of the drive wheel 76 during and at the end of the elapsed time period, accounting for intervening gear ratios, e.g., those associated with transfer gear set(s) 72 (212).

An output speed profile during the gear lash event is established or otherwise determined (214). The output speed profile includes an initial output speed that is preferably equal to a final output speed, and includes a plurality of subperiods during which changes to the output speed and corresponding changes to the lash angle are established in order to phase-shift the lash angle to effect operation in the second torque transfer state within the elapsed time period. An exemplary output speed profile is depicted with reference to FIG. 3.

A preferred output speed profile is determined, and corresponds to a combination of the output speed profile and the target output speed during the lash event (216). The preferred output speed profile provides prescribed changes to the output speed during the lash event, with the final output speed substantially equal to the target output speed at the end of the elapsed time period while coincidentally phase-shifting the lash angle from a minimum lash angle to a maximum lash angle. The minimum lash angle is the lash angle associated with torque transfer in the first torque transfer state, i.e., one of the positive and negative torque transfer states. Similarly, the maximum lash angle is the lash angle associated with torque transfer in the second torque transfer state, i.e., the other of the positive and negative torque transfer states.

The preferred output speed profile during the gear lash event includes a plurality of subperiods during which prescribed changes to the output speed and corresponding changes to the lash angle are established in order to phase-shift the lash angle to effect operation in the second torque transfer state within the elapsed time period with minimal or no noticeable or objectionable driveline clunk or jerk. In one embodiment, first, second, and third subperiods are established during the elapsed time period for completing the gear lash event. Prescribed changes in the output speed during each of the first, second, and third subperiods are determined, as described. An exemplary embodiment of a preferred output speed profile including a plurality of subperiods with prescribed changes to the output speed and corresponding changes to the lash angle is depicted with reference to FIG. 3.

Prescribed changes in the output speed during the first subperiod include changes in the output speed to phase-shift the lash angle to a substantial portion of the maximum lash angle during the first subperiod. Phase-shifting the lash angle to a substantial portion of the maximum lash angle means the lash-angle has traversed a substantial portion of the gear lash between the minimum lash angle and the maximum lash angle. In one embodiment, phase-shifting the lash angle to a substantial portion of the maximum lash angle means that the lash angle phase-shifts to a position that is greater than 75% of the maximum lash angle, and may include achieving a position that is 90% of the maximum lash angle. The prescribed changes in the output speed to phase-shift the lash angle to a substantial portion of the maximum lash angle preferably includes a time-rate change in the output speed that includes either reducing the output speed or increasing the output speed to effect the phase-shift of the lash angle to the substantial portion of the maximum lash angle.

Preferably, determining the prescribed changes in the output speed such that the lash angle phase-shifts to the substantial portion of the maximum lash angle during the first subperiod includes using a digital filter or another algorithmic construct to determine the prescribed changes in the output speed. The digital filter uses the maximum lash angle, the wheel speed, and an elapsed period of time associated with the first subperiod to determine the prescribed changes in the output speed such that the lash angle phase-shifts to the substantial portion of the maximum lash angle. Limits on the changes in the output speed may be associated with capability of the torque machine, i.e., either or both the first and second motor/generators 15 and 25, including time-rate(s) of change in the respective speeds. The output speed may be thus limited to a predetermined maximum change during the first subperiod.

Prescribed changes in the output speed during the second subperiod include changes in the output speed that are at a rate equal to the changes in the target value for the output speed during the second subperiod. When the wheel speed changes, the target value for the output speed changes in equal measure. This allows any driveline irregularities occurring during the first subperiod, e.g., speed changes, to settle out. The phase-shift the lash angle during the second subperiod occurs at a reduced rate relative to the first subperiod.

Prescribed changes in the output speed during the third subperiod include determining prescribed changes in the output speed such that the output speed is substantially equal to the target value for the output speed and the lash angle phase-shifts to the maximum lash angle at the end of the third subperiod. The prescribed changes in the output speed during the third subperiod may include prescribed changes in the output speed such that the output speed is asymptotic to the target value for the output speed at the end of the elapsed time period with the lash angle achieving the maximum lash angle at the end of the third subperiod. Preferably there is a time-rate change in the output speed that causes the output speed to converge on the target value for the output speed as the lash angle phase-shifts to the maximum lash angle at the end of the third subperiod.

The electric motor/generator(s), i.e., one or both the first and second motor/generators 15 and 25 (MB) in the embodiment depicted in FIG. 1, are controlled in response to the preferred output speed profile during the torque transition event (218). In one embodiment, controlling the electric motor/generator(s) in response to the preferred output speed profile includes controlling the output speed to be substantially equal to the target value for the output speed at the end of the elapsed time period with the lash angle having phase-shifted to the maximum lash angle. In one embodiment controlling the output speed to be substantially equal to the target value for the output speed at the end of the elapsed time period means that a difference between the output speed and the target value for the output speed at the end of the elapsed time period is less than 40 rpm, or another difference value that is suitable for the operating system and application. Determining that the output speed is substantially equal to the target value for the output speed at the end of the elapsed time period comprehends that the impact of the gears of the gear set at the end of the torque transition event will be minimal, with a corresponding effect upon audible clunk and driveline jerk.

Figure 3:
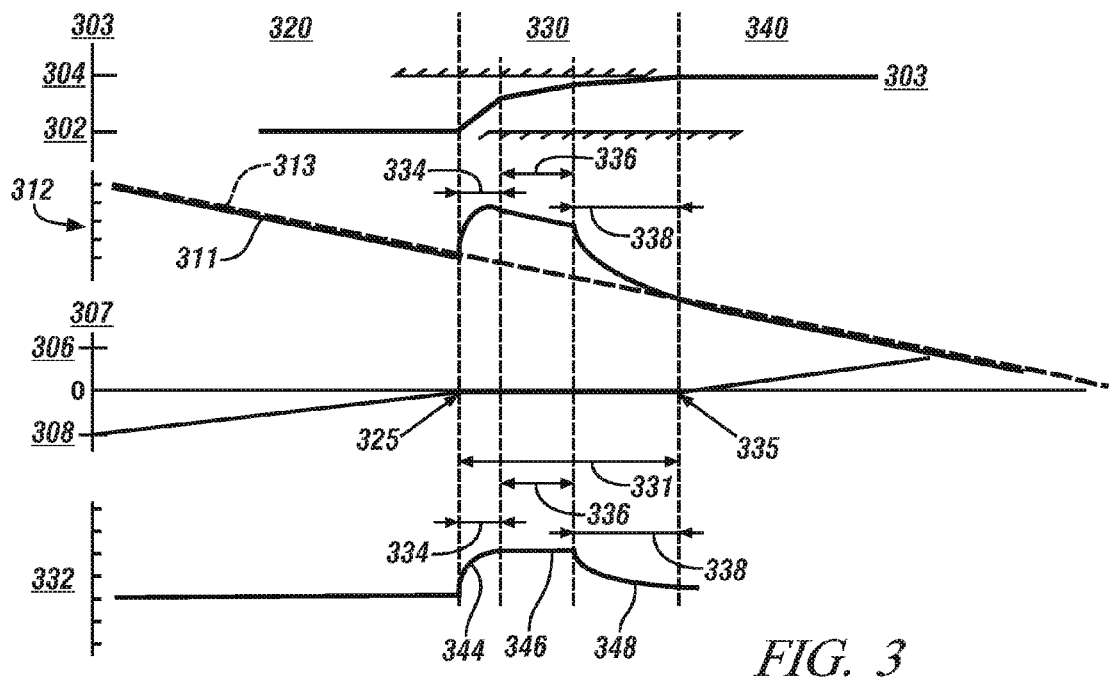
FIG. 3 graphically shows data associated with an implementation of the control scheme described with reference to FIG. 2, in accordance with the disclosure.

FIG. 3 graphically shows data associated with an implementation of the control scheme 200 described with reference to FIG. 2. Parameters depicted on the y-axis are coincidentally plotted in relation to elapsed time on the x-axis. The parameters include a lash angle 303, output speeds 312, axle torque 307 indicating a torque transition event of interest, and an output speed profile 332, each which is described with reference to FIG. 2. The output speed graph 312 depicts a target output speed 311 and a preferred output speed profile 313. Each of the parameters is depicted in relation to a torque transfer transition from a first torque transfer state 320 through a gear lash event 330 to a second torque transfer state 340.

The lash angle 303 depicts a lash angle in a transfer gear set between a wheel and an output member of a powertrain system, e.g., transfer gear set(s) 72 between wheel(s) 76 and output member 55 of powertrain system 5 in the embodiment shown in FIG. 1. The depicted lash angle 303 includes a minimum lash angle 302 and a maximum lash angle 304. As previously described, the minimum lash angle is the lash angle associated with torque transfer in the first torque transfer state 320, i.e., one of the positive and negative torque transfer states. Similarly, the maximum lash angle is the lash angle associated with torque transfer in the second torque transfer state 340, i.e., the other of the positive and negative torque transfer states.

The axle torque 307 includes a negative wheel torque 308, a transition to zero torque, and a positive wheel torque 306. As depicted the first torque state 320 includes the axle torque 307 initially negative and increasing to zero torque at time point 325. At time point 335, the axle torque 307 increases to positive, indicated by the second torque state 340. The target output speed used in the output speed profile 332 is determined at time point 335. During an elapsed time period 331 between time point 325 and time point 335, the axle torque 307 is zero, indicating the gear lash event 330. The elapsed time period 331 is preferably predetermined and is a set elapsed time period for completing the gear lash event 330 across the transfer gear set.

The output speed profile 332 includes an initial output speed that is preferably equal to a final output speed. The output speed profile 332 includes first, second and third subperiods 334, 336, and 338, respectively, with corresponding first, second and third prescribed speed changes 344, 346, and 348, respectively, each which is preferably predetermined. The first, second and third subperiods 334, 336, and 338 combine for the elapsed time period 331 for completing the gear lash event across the transfer gear set, which is preferably predetermined.

The first prescribed speed change 344 commanded during the first subperiod 334 is characterized by prescribed changes in the output speed to phase-shift the lash angle through a substantial portion of the maximum lash angle, as previously described.

The second prescribed speed change 346 commanded during the second subperiod 336 is characterized by having prescribed changes in the output speed at a rate equal to the changes in the target value for the output speed. During the second subperiod 336, the lash angle may change, although the change may be minimal.

The third prescribed speed change 348 commanded during the third subperiod 338 is characterized by having prescribed changes in the output speed such that the output speed converges to the target output speed and the lash angle phase-shifts to the maximum lash angle at the end of the third subperiod.

The output speed graph 312 depicts a target output speed 311 and a preferred output speed profile 313. The target output speed 311 indicates a time-rate change in the output speed without induced changes. The target output speed 311 is substantially equal to the target value for the wheel speed of the drive wheel 76 accounting for intervening gear ratios, and indicates rotational speed of an output member of the transmission. Portions of the target output speed 311 are estimated or otherwise determined to permit the control scheme 200 to control operation of the powertrain system to achieve the target wheel speed during the lash event. The preferred output speed profile 313 shown during the elapsed time period 331 indicating the gear lash event 330 is constructed by adding the first, second and third prescribed speed changes 344, 346, and 348 of the output speed profile 332 to the target output speed 311 beginning at time point 325 coincident with the onset of gear lash event 330 and ending at time point 335 coincident with the end of the gear lash event 330 during the corresponding first, second and third subperiods 334, 336, and 338.

Thus, as depicted, when the gear lash event 330 begins at time point 325, the rotational speed of the second motor/generator 25 is controlled so the output speed of the output member 55 corresponds to the preferred output speed profile 313 that is determined based upon the target output speed 311 adjusted using the output speed profile 332. This includes controlling the second motor/generator 25 so the output speed of the output member 55 follows the preferred output speed profile 313 including the first, second and third prescribed speed changes 344, 346, and 348 adjusted using the output speed profile 332, with the output speed converging to the target output speed 311 as the lash angle phase-shifts to the maximum lash angle at the end of the third subperiod 338.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including a torque machine mechanically rotatably coupled via a transfer gear set to a drive wheel, the transfer gear set comprising a first gear meshingly engaged to a second gear, the transfer gear set including a lash angle between the first and second gears, the method comprising:
monitoring an output speed associated with the torque machine and a wheel speed associated with the drive wheel;
detecting a transition between a first torque transfer state and a second torque transfer state, the transition including a gear lash event across the transfer gear set;
setting an elapsed time period for completing the gear lash event across the transfer gear set during the transition between the first torque transfer state and the second torque transfer state;
determining a target output speed derived from the wheel speed during and at the end of the elapsed time period;
determining a preferred output speed profile during the gear lash event, the preferred output speed profile comprising prescribed changes in the output speed associated with phase-shifting the lash angle from a minimum lash angle to a maximum lash angle and adjusting the output speed to be substantially equal to the target output speed at the end of the elapsed time period; and
controlling the torque machine to achieve the preferred output speed profile.

2. The method of claim 1, wherein determining the preferred output speed profile during the gear lash event comprises:
determining an output speed profile comprising prescribed changes in the output speed associated with phase-shifting the lash angle from the minimum lash angle to the maximum lash angle during the elapsed time period; and
determining the preferred output speed profile by combining the output speed profile with the target output speed derived from the wheel speed during and at the end of the elapsed time period.

3. The method of claim 2, wherein determining the preferred output speed profile comprises establishing first, second, and third subperiods during the elapsed time period and determining prescribed changes in the output speed during each of the first, second, and third subperiods.

4. The method of claim 3, wherein determining prescribed changes in the output speed during the first subperiod comprises determining prescribed changes in the output speed such that the lash angle phase-shifts to a substantial portion of the maximum lash angle during the first subperiod.

5. The method of claim 4, wherein determining prescribed changes in the output speed such that the lash angle phase-shifts to the substantial portion of the maximum lash angle during the first subperiod comprises determining prescribed changes in the output speed using an algorithmic construct having inputs including the maximum lash angle, the wheel speed, and an elapsed period of time associated with the first subperiod, wherein the output speed at the end of the elapsed period of time associated with the first subperiod is limited to a predetermined maximum change in the output speed.

6. The method of claim 3, wherein determining prescribed changes in the output speed during the second subperiod comprises maintaining the output speed equal to the target output speed during the second subperiod.

7. The method of claim 3, wherein determining prescribed changes in the output speed during the third subperiod comprises determining prescribed changes in the output speed such that the output speed converges with the target output speed and the lash angle phase-shifts to the maximum lash angle at the end of the third subperiod.

8. The method of claim 7, wherein determining prescribed changes in the output speed during the third subperiod comprises determining prescribed changes in the output speed such that the output speed is asymptotic to the target output speed at the end of the elapsed time period.

9. The method of claim 2, wherein determining the preferred output speed profile during the gear lash event comprises establishing first and third subperiods during the elapsed time period for completing the gear lash event and determining prescribed changes in the output speed during each of the first and third subperiods.

10. The method of claim 9, wherein determining prescribed changes in the output speed during the first subperiod comprises determining prescribed changes in the output speed such that the lash angle phase-shifts substantially toward the maximum lash angle during the first subperiod.

11. The method of claim 9, wherein determining prescribed changes in the output speed during the third subperiod comprises determining prescribed changes in the output speed such that the output speed converges with the target output speed and the lash angle phase-shifts to the maximum lash angle at the end of the third subperiod.

12. The method of claim 1, wherein controlling the torque machine to achieve the preferred output speed profile comprises controlling the torque machine using the preferred output speed profile such that the output speed is substantially equal to the target output speed at the end of the elapsed time period and the lash angle phase-shifts to the maximum lash angle at the end of the elapsed time period.

13. The method of claim 12, wherein controlling the torque machine using the preferred output speed profile such that the output speed is substantially equal to the target output speed at the end of the elapsed time period comprises controlling the torque machine using the preferred output speed profile such that a difference between the output speed and target output speed at the end of the elapsed time period is less than 40 rpm.

14. The method of claim 1, wherein controlling the torque machine to achieve the preferred output speed profile comprises controlling rotational speed of the torque machine to effect the phase-shifting of the lash angle from the minimum lash angle to the maximum lash angle at the end of the elapsed time period.

15. Method for operating a powertrain system including a torque machine mechanically rotatably coupled via a transfer gear set to a drive wheel, the transfer gear set comprising a first gear meshingly engaged to a second gear, the transfer gear set including a lash angle between the first and second gears, the method comprising:
   monitoring an output speed associated with the torque machine and a wheel speed associated with the drive wheel;
   detecting a gear lash event across the transfer gear set;
   setting an elapsed time period for completing the gear lash event;
   determining a target output speed derived from the wheel speed during the elapsed time period;
   determining a preferred output speed profile during the gear lash event, the preferred output speed profile comprising prescribed changes in the output speed associated with phase-shifting the lash angle from a minimum lash angle to a maximum lash angle and adjusting the output speed to be substantially equal to the target output speed at the end of the elapsed time period; and
   controlling the torque machine in response to the preferred output speed profile.

16. The method of claim 15, wherein determining the preferred output speed profile during the gear lash event comprises:
   determining an output speed profile comprising prescribed changes in the output speed associated with phase-shifting the lash angle from the minimum lash angle to the maximum lash angle during the elapsed time period; and
   combining the output speed profile with the target output speed derived from the wheel speed during and at the end of the elapsed time period.

17. The method of claim 16, wherein determining the output speed profile comprises establishing first, second, and third subperiods during the elapsed time period for completing the gear lash event and commanding prescribed changes in the output speed during each of the first, second, and third subperiods.

* * * * *